United States Patent

Guyot

[15] 3,690,363
[45] Sept. 12, 1972

[54] GLASS CORDS AND TIRES AND SIMILAR RUBBER ARTICLES REINFORCED THEREWITH

[72] Inventor: Raymond Guyot, Paris, France
[73] Assignee: FIVEREL, Societe Civile d'Etudes et de Recherches, Paris, France
[22] Filed: Nov. 13, 1970
[21] Appl. No.: 89,293

[52] U.S. Cl. ............................152/359, 57/140 G
[51] Int. Cl. ..................................................B60c 9/08
[58] Field of Search.....................152/359; 57/140 G

[56] References Cited

UNITED STATES PATENTS 3,453,652   7/1969   Marzocchi............57/140 G X

*Primary Examiner*—Gerald M. Forlenza
*Assistant Examiner*—Robert Saifer
*Attorney*—Sherman and Shalloway

[57] ABSTRACT

Cords, particularly adapted for the reinforcement of tires as radial carcasses, composed of glass filaments individually coated with an elastomer sheath, such cords being characterized by a corrected primary twist factor greater than 90, a corrected secondary twist factor greater than 130 and an elongation at rupture of less and 3.5 percent. The glass cords constituting the radical carcass are preferably interrupted under the breaker of the tire at the level of the equatorial plane forming two half carcasses which are substantially symmetrical. A substructure reinforcement layer may be placed under the breaker under the ends of such two half carcasses, the reinforcing layer having a width at least equal to the distance that separates the two half carcasses.

6 Claims, 3 Drawing Figures

PATENTED SEP 12 1972  3,690,363

INVENTOR
RAYMOND GUYOT

BY *Sherman & Galloway*
ATTORNEYS

GLASS CORDS AND TIRES AND SIMILAR RUBBER ARTICLES REINFORCED THEREWITH

BACKGROUND OF THE INVENTION

The present invention relates to novel glass cords and tires and similar rubber and plastic articles reinforced therewith; more particularly, the present invention is directed to such glass cords having high corrected twist factors and a slight elongation at rupture, which cords are particularly suited as the carcass in radial ply tires.

It should be recognized that in tire construction a number of fabrics have been employed as reinforcement components, usually referred to as the carcass. For example, over the years, cotton, rayon, nylon and polyester have been employed in the fabrication of the carcass plies of radial and similar tire constructions.

While all of the foregoing fabrics have been employed in the production of carcass plies for reinforcement for radial and similar tires, all of such organic textiles, while possessing certain advantageous properties making them suitable for use as reinforcing carcasses, also possess certain disadvantages with regard to such reinforcement. Accordingly, glass fibers have been suggested as a suitable reinforcing component for pneumatic tires.

For example, cords produced from glass filaments have been described and in the past several years, such cords have been used for reinforcing tires and similar rubber and plastic objects. However, notwithstanding the use of such cords of glass filaments as reinforcing carcass plies, the glass cords described and used to date have had only slight corrected twist factors, such characteristics being disadvantageous with regard to the working resistance of the tires and similar objects reinforced with such glass cords. In actuality, such glass cords which have been previously used for the reinforcing of tires and similar rubber objects have had a corrected twist factor substantially below 90; however, if, per chance, such twist factor exceeded 90, the cords which have been previously utilized have had an elongation at rupture in excess of 4 percent, i.e., within the order of 5 to 8 percent. This also is very disadvantageous in that such excessive elongation to rupture is responsible for the deformation of the reinforced tires and similar articles and consequently responsible for their more rapid destruction.

Notwithstanding the foregoing disadvantages associated with conventionally used glass cords as reinforcements for radial tires, tires reinforced with radial carcasses of glass cord offer numerous advantages, particularly, in the use of an inexpensive material that can be easily changed into flexible and very resistant filaments. In this regard, while such filaments are sensitive to the abrasive action of one filament against the other, the filaments can, nevertheless, be assembled in twist yarns and cords with excellent resistance by coating the filaments individually and completely with an elastomer sheath. In this connection, such glass filament constructions present certain advantages over cellulosic and similar cords in that such glass cords give practically indeformable carcasses.

Notwithstanding such inherent advantages associated with the use of glass cords as reinforcing carcasses for radial tires, attempts at reinforcing tires with a radial carcass of glass cords has not been satisfactory to date. This is again due to the fact that the cords used to date have had a slight corrected twist factor and their placement in tires did not sufficiently take into consideration the properties of the glass.

BRIEF DESCRIPTION OF THE INVENTION

All of these inherent deficiencies and difficulties associated with the use of glass cords as reinforcements for radial tires have been eliminated in accordance with the present invention. In this regard, the glass cords of the present invention and the tires and similar rubber and plastic articles reinforced therewith are characterized by the fact that the glass cords have a corrected primary twist factor greater than 90 and a corrected secondary twist factor greater than 130, such terms being hereinafter defined. In addition, such cords composed of glass filaments are characterized by an elongation at rupture of less than 3.5 percent.

It is an additional feature of the present invention that pneumatic tires reinforced with the glass cords of the present invention can be reinforced by a small number of layers, preferably, by a single layer of cords. In addition, in accordance with a preferred embodiment of the present invention such single layer of cords of glass filaments is one in which such carcass is interrupted under the breaker, substantially at the equatorial plane of the tire. Moreover, in connection with such embodiment of the present invention wherein the reinforcing carcass is interrupted under the breaker, it is preferred in accordance with the present invention that the tire additionally contain a substructure reinforcement layer under the breaker and under the ends of the carcass portion, such reinforcing layer having a width at least equal to the distance which separates the carcass portions.

Accordingly, it is the principal object of the present invention to provide novel glass cords which have eliminated the inherent deficiencies and disadvantages of previous glass cords.

It is a further object of the present invention to provide such novel glass cords, particularly adapted as the reinforcing carcass for pneumatic tires, wherein said cords are characterized by high corrected twist factors and a low elongation at rupture.

A still further object of the present invention relates to such novel glass cords and pneumatic tires and similar rubber and plastic articles reinforced therewith wherein said glass cords are composed of glass filaments individually coated in an elastomer sheath, the glass cords being characterized by a corrected primary twist factor greater than 90, a corrected secondary twist factor greater than 130 and an elongation at rupture of less than 3.5 percent.

Yet a further object of the present invention relates to such glass cords and tires reinforced therewith wherein the cords are employed as a single layer constituting the radial carcass, such radial carcass preferably being interrupted under the breaker at a level substantially at the equatorial plane of the tire, the two carcass halves being formed being substantially symmetrical.

Yet a further object of the present invention relates to such glass cords and a pneumatic tire reinforced therewith wherein the radial carcass is interrupted and a substructure reinforcement layer is placed under the breaker, under the ends of the two halves of the carcass, such reinforcing layer having a width at least equal to the distance separating the two half carcasses.

Still further objects and advantages of the present invention will become apparent from the following more detailed description of the present invention.

DETAILED DESCRIPTION OF THE INVENTION

As indicated above, the present invention is predicated upon an improvement in glass cords, particularly those adapted for reinforcing carcasses of pneumatic tires, wherein the glass cords have a corrected primary twist factor of greater than 90, a corrected secondary twist factor of greater than 130, and an elongation at rupture of less than 3.5 percent. In this regard, the glass cords in accordance with the present invention are produced by applying a secondary twist to two or more twist yarns which have been produced by applying a primary twist to a bundle of filaments, etc. In this regard, the term "twist yarn," as employed in accordance with the present invention describes an assembly made up of a bundle of filaments or several simple threads which have been grouped together by twisting, such twisting being more specifically described by the expression "primary twisting." The term "cord" describes an assembly of several twist yarns which have been grouped together by twisting, this twisting being more specifically described by the expression "secondary twisting." As is well known, in such a cord, the primary twisting and the secondary twisting are in opposite directions.

To materialize the level of twist, it is customary to refer to the twist factor $C_k$ (Koechlin's law), which links the twist per meter of a yarn to its cross section or more conveniently to its metric number. The twist factor $C_k$, is linked to twist T, expressed in turns per meter, and to the metric number MN by the following equation:

$$C_k = T / \sqrt{MN}$$

Application of this formula to a rayon cord currently used, as for example, the 1840 × 2 dtex cord, having twists per meter of Z 472/ S 472 (primary and secondary twists, respectively) and a final count of approximately $MN = 2.3$, indicates that with cellulose textiles, a twist factor in cordage of the order of 300 is conventional. However, to compare the twists used for glass threads with the twists used for cellulose textiles, i.e., to compare twist related to identical cross sections, the differences in density of these two materials (2.5 for glass and 1.52 for cellulose) must be taken into account. This leads, in the case of glass, to a twist factor C, expressed as follows:

$$C = \frac{T}{\sqrt{\frac{2.5}{1.52} MN}} = \frac{T}{1.28\sqrt{MN}}$$

The metric number (MN) in the above formula is calculated from the equation $MN = 1000/\text{titer}$ in tex as described in French Standard NF G 00–005.

This twist factor C expresses the "corrected twist factor" of the cords according to the present invention. The corrected twist factor corresponding to the primary twist is designated by the expression "corrected primary twist factor" ($C_1$). The corrected twist factor corresponding to the secondary twist is designated by the expression "corrected secondary twist factor" ($C_2$).

The corrected primary twist factor characterizing the cord of the present invention is, conventionally, the corrected twist factor of the twist yarns used for the fabrication of this cord, before cabling.

Normally, the measurement of the final metric number takes into account the shortening caused by the twisting when such twisting reaches a sufficient level. In the case of twist yarns or cords of glass, the elastomer which avoids abrasion of the filaments against one another most of the time is placed on the simple threads, i.e., before the twisting operations. This fills the spaces between the filaments without notably changing the cross section of the threads but reduces the metric number MN and hinders the determination of the real twist factor, since the percentage of the elastomer related to the glass can vary.

To obtain the final metric number MN of the cord or twist yarn of glass filaments only, it is necessary to eliminate, by burning, the impregnation products, although deformations of the glass, which can alter the measurements, may occur. Under these conditions, it is more convenient to define the corrected twist factors of the twist yarns or cords of glass according to the invention by disregarding the contractions due to twisting and the content of impregnation product and by utilizing only the theoretical metric numbers of the glass making up the threads. This simplified method, applied to a glass cord of 680 × 3 × 3 dtex, Z 350/ S 300 twists provides, by calculation, a primary twist factor $C_1$ of 124 and a secondary twist factor $C_2$ of 183, whereas by actual measurement, a primary twist factor $C_1$ of 127 and a secondary twist factor $C_2$ of 190 are obtained. This shows that the difference between the calculated twist factor and the measured twist factor is relatively slight.

It can clearly be seen from the foregoing, that in contradiction with regular rayon cords, etc., the twist factors $C_1$ and $C_2$ for glass cords provide a much more exact idea of the preferred twist zone which should be utilized for glass. In this regard, it must be recognized that in accordance with the present invention, the preferred twist zone as described above is different from that generally employed for textile cords and in addition, different from that which has been previously utilized with conventional glass cords.

In addition to the foregoing characteristics with regard to the corrected primary twist factor and corrected secondary twist factor, the glass cords in accordance with the present invention must be those which have an elongation at rupture of less than 3.5 percent. Accordingly, this is a further characteristic which defines the glass cords utilized in accordance with the present invention and distinguishes the same from anything utilized heretofore.

For the glass cords of the present invention to provide such slight elongation, i.e., less than 3.5 percent, and to present the required qualities for reinforcing rubber objects, particularly, tires, the glass cords should be perfectly balanced. As is well known, balancing of a cord depends on many factors, particularly, the number of twist yarns making up the cord, the primary twist (of the yarns), the secondary twist (of the cord), the respective counts of the twist yarns and cord, the nature of the filaments forming the cord and the nature and percentage of the elastomer surrounding the filaments. While theoretical calculations of the balancing are complicated, it can be generally noted that a cord is balanced when the untwisting couples of the twist yarns constituting the cord are exactly opposed by the untwisting couple of the cord itself. The twist levels to be used to provide good balancing are often determined experimentally. For example, the balancing of a cord can be determined as follows:

On a cylinder, 120 mm in diameter, a sheet of rubber 0.35 mm thick is placed and then the cord to be studied is wound on a width of 6 cm with a pitch which is a function of its diameter (0.8 mm for the cord of 680 × 3 × 3 dtex). The sheet/cords are covered with a second sheet of rubber strongly applied. The layer is then cut to a length of 37.7 cm and a width of 6 cm.

If this layer rolls up like a tube, the cord is considered as unbalanced and unusable for reinforcing rubber objects such as tires. If one corner of the layer rises slightly, the cord is still usable (but by alternating the twists from one cord to the other). If the layer remains flat, the cord is considered balanced.

It should be recognized that with regard to glass cords having a very high modulus, if the primary and secondary twists as set forth above are poorly chosen, twisting and kinking can occur and the reinforcement which is provided by such glass cord as in the case of a pneumatic tire is then irregular.

By way of example, a glass cord of 680 × 3 × 3 dtex, impregnated with 18 percent elastomer, has satisfactory balancing for a primary twist of 350 and a secondary twist of 300. The importance of balancing the cords and, therefore, of the precision in putting them in place is such that it is recommended to alternate the twists of the cords. For example, in the case of the cord with 680 × 3 × 3 dtex twists: 350/300, it is preferable to give to all even number cords of the layer, twists Z 350 S 300 and, to all odd number cords, opposite twists S 350 Z 300.

It has been discovered that it is advantageous, when low degrees of elongation are desired, to provide the twist in two stages. This permits a better placing of the filaments. In this way, for a determined level of twist, lower elongations can be obtained. For example, for a cord of glass filaments of 680 × 3 × 3 dtex, having twists Z 350 / S 300, a lower and more regular elongation will be obtained if the Z twist is provided in two stages, for example, one of 200 turns per meter and one of 150 turns per meter and if the S twist is obtained by a first twist of 180 turns followed by a second twist of 120 turns.

To determine the elongation of the cords at rupture, a dynamometer is used, equipped with opposite locking jaws of the type described in the Bulletin BISFA (International Bureau for the Standardization of Artificial Fibers), 1967 edition, chapter G, page 44, but the diameter of the jaws is 70 mm to reduce to a maximum the compression of the coils in contact with the jaw and the extension of the opposite coils. Further, to eliminate errors due to placing the cord on the jaws, elongations of two samples of different length are measured. The difference in elongations is then related to the difference of the length of the samples to determine the elongation at rupture of the glass cord. The elongations at rupture are determined for breaking periods of 8 seconds related to a sample 50 cm long for a cord not coated with rubber.

In accordance with the present invention, the glass cords are produced by impregnating several glass threads made up of a large number of continuous filaments with a suitable resin capable of forming an elastomer, the threads being arranged so that the elastomer gives a good coat on the individual filaments. In this regard, the glass cords of the present invention are those in which the individual glass filaments making up the cord are individually coated with an elastomeric sheath.

In accordance with the present invention, the resin or elastomer which is utilized to provide an elastomer sheath around the individual filaments of the glass cord can be any of those materials which have been previously utilized for this purpose. For example, an exemplary composition which can be employed to impregnate the glass threads to provide the desired elastomer sheath can comprise the following:

| | |
|---|---|
| water | 69.7% |
| resorcin/formal resin | 3.3 |
| natural rubber latex | 13.5 |
| vinylpyridine latex | 13.5 |

It should be quite obvious that other equivalent elastomeric materials well documented in the literature can be utilized in accordance with the present invention to provide an elastomer sheath on the individual filaments of the glass cords of the present invention. In this regard, as indicated previously, such elastomer sheath avoids abrasion of the filaments against one another during twisting and in use.

After the resin has been slightly polymerized to form an elastomer sheath around the individual filaments, the threads are twisted together to the desired degree to form a twist yarn having a primary twist factor $C_1$ greater than 90. Thereafter, such twist yarn is associated with other identical twist yarns by twisting in the opposite direction to form a cord, this second twisting being conducted so that the secondary twist factor, $C_2$ is greater than 130 and the cord obtained is balanced.

As indicated previously, it is a preferred embodiment of the present invention to employ the novel glass cords above described as the reinforcing carcass of a radial tire. In this regard, the present invention is particularly directed to such radial-type tires, the carcass of which is made up of one or more layers of the previously described glass cords.

It is important to note in accordance with the present invention that due to the characteristics described above with regard to the primary and secondary twist factors and elongation to rupture of less than 3.5 percent for the glass cords, it is possible to build tires with a thin carcass and of excellent quality. In actuality, by adopting certain preferred conditions previously described and hereinafter described, it is possible to provide radial tires reinforced with a single carcass layer of glass cords which provides superior results in practice to similar tires reinforced with two or three layers of glass cords for the same amount of reinforcing glass. In this regard, the tires produced in accordance with the present invention are superior to previously provided tires employing reinforcing glass cords with regard to resistance to bending and resistance to lateral impact and life.

This is explained, for example, by the fact that when a tire, mounted on its rim, is overloaded, the inside layers of its carcass are compressed and the outside layers are drawn in relation to the zone known as the "neutral fiber" which is neither under compression nor extension. These phenomena are more pronounced as the distance increases away from the neutral fiber, the twist yarns and cords of glass not being able to support very great compression and extension forces.

It is for the foregoing reasons that it is preferable to produce tires with thin carcasses in which all of the cords are as close as possible to the neutral fiber, i.e., carcasses with a minimum number of layers. In accordance with the preferred embodiment of the present invention wherein the carcass is composed of a single layer, the axis of the cord is practically merged with the neutral fiber and the extension and compression forces on the cord are minimized. Accordingly, it is for the above reasons that it is preferred in accordance with the present invention that the radial tire be one wherein the carcass is constituted by a single layer of cords. This, of course, can be accomplished in accordance with the present invention utilizing the specifically defined glass cords, although such an embodiment was not previously obtainable with heretofore developed products.

In accordance with a preferred embodiment of the present invention, the reinforcing carcass of the radial tire is one which is interrupted under the breaker substantially at the level of the equatorial place. In conventionally utilized radial tires, the carcass cords generally go from one bead to the other without a break. However, when such a technique is applied to carcasses of glass cords it does not permit the axis of the carcass cords, located under the breaker, to coincide with the neutral fiber. In this regard, the position of the neutral fiber in the region of the breaker is modified by the presence of the breaker layers themselves. Accordingly, if the layer of the carcass is continuous, it is quite possible that a progressive destruction of the glass cords will occur during use of the tire. To avoid such difficulties and disadvantages, in accordance with a preferred embodiment of the present invention, the glass cords of the carcass are interrupted under the breaker so as to not be outside the zone of the neutral fiber; preferably such interruption produces two substantially symmetrical halves, each half having a first end at the wire and a second end under the breaker. Although such glass cords of the carcass are interrupted in accordance with such a preferred embodiment of the present invention, the glass cords of the carcass do go under the breaker to a sufficient extent so as to provide good anchoring of the carcass layers. The ends of the halves of the carcass reinforcement are separated a predetermined distance according to the size of the tire and a proper distance for any particular tire is easily determined.

When a radial tire is produced with an interrupted carcass as in accordance with the above-described preferred embodiment of the present invention, it is also advantageous, in accordance with a further preferred embodiment, to place a reinforcing layer of substructure under the ends of the carcass portions so that this reinforcing layer extends not only over the distance between the free ends of the carcass portions, but also goes beyond on both sides of such free ends. Accordingly, when employing a reinforcing substructure, the same is generally placed so as to span not only the interval between the free ends of the two half carcasses, but also beyond such ends underlying a portion of the half carcasses themselves.

It should be quite obvious from the foregoing description that the tires which are produced in accordance with the present invention have thin walls and working characteristics comparable to those using conventional organic textiles. Accordingly, the tires in accordance with the present invention are extremely economical and have advantageous properties in that they do not expand and have good resistance to impacts and road stresses.

The specific examples which follow are described in connection with the accompanying figures wherein.

Figure 1:
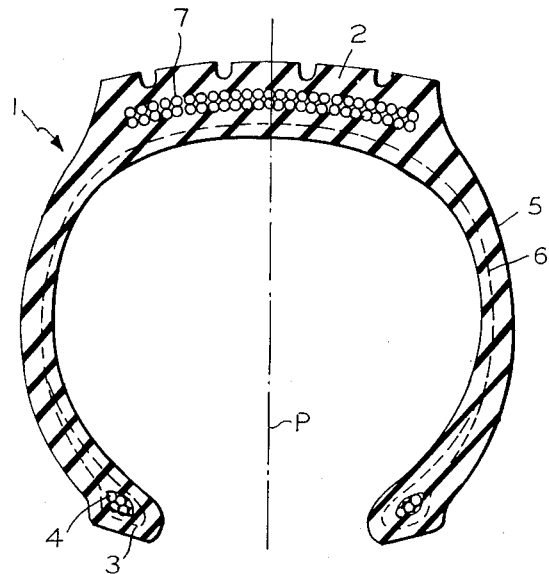
FIG. 1 is a sectional view of a tire in accordance with the present invention with a continuous radial carcass.

In connection with the following examples, tires for passenger cars and for trucks were examined by the following tests:

A. In the case of a 165 × 380 tire, for passenger cars.

1. test on rolling machine.

The tire, mounted on an automobile wheel, inflated to 1.8 kg/cm$^2$ (constant pressure during the entire period of the test), is moved by a weight of 500 kgs into contact with a rotating wheel 1 meter in diameter, with a flat rim, whose tangential speed is 50 km/hr. The rotating wheel with its accessories is commonly known as a "rolling machine."

The wheel is provided with a plunger pin, with a hemispheric end 61 mm in height, 35 mm in diameter and inclined 45°, projecting on the outside surface of the rim. The orientation of the plunger pin is such that its hemispheric end strikes the tire. The ambient temperature during the test is kept at 30°–32° C.

These operating conditions correspond to about 16,000 impacts per hour. The cords are examined periodically during rotation of the tire or else the test is run until the tire blows out.

2. resistance of the carcasses to lateral impact.

The tire is mounted at the rear of a normally loaded vehicle which travels on a concrete track at a rate of about 35 km per hour, kept as constant as possible. The track is provided with obstacles composed of steel angle irons, at a sharp angle, which project 11.5 cm in height. These irons form a 30° angle with the axis of the track and, therefore, when the vehicle passes over the obstacles, such passage is accompanied by a great lateral deformation of the tire. Resistance to lateral impact is determined by measuring the number of impacts necessary to puncture the tire. When the inner tube is punctured, it is repaired and the test continued with the same tire, until rupture. The resistance to impact is obtained by finding the average of the results on at least three identical tires.

3. speed test

The tire to be tested is mounted on an automobile, which travels at an average speed of 100 kilometers per hour on a race track. The track is 9,180 meters long having very pronounced turns and the vehicle is driven by a trained driver. The test is sufficiently hard that, after 40 turns of the track, the tread is greatly deteriorated. After a determined number of laps, the tires are cut to examine the state of the reinforcements. In this way, it is possible to examine the degradation that the reinforcing carcasses have undergone.

B. In the case of a 8.25 × 20 tire, for trucks

The same wheel is used but not provided with a plunger pin, turning at the same speed and the operation is also at an ambient temperature of 30°–32 C. However, the tire is inflated to a pressure of 5.4 kg/cm², which is kept constant during the entire test period. When the test is started, the tire is held to the rim with a load of 1,130 kgs which is brought progressively to 1,980 kgs as follows:

| | | |
|---|---|---|
| 0 to 24 hours — normal load — overload | | 0 –load 1,130 kgs |
| 24 to 28 hours | overload | 25% – load 1,412 kgs |
| 48 to 72 hours | overload | 35% – load 1,575 kgs |
| 72 to 96 hours | overload | 45% – load 1,638 kgs |
| 96 to 120 hours | overload | 55% – load 1,751 kgs |
| 120 to 144 hours | overload | 65% – load 1,864 kgs |
| 144 and more | overload | 75% – load 1,977 kgs |

The tire having a diameter of 950 mm, close to that of the wheel, undergoes a great deformation in the zone of contact under the above conditions. This can be estimated at 20/25 percent of the diameter of the tire body. The additional maximum load of 75 percent is reached after 144 hours or 7,200 kms. The slight overloads make it possible to detect fabrication anomalies which can falsify the results.

In general, the rolling is carried on until the destruction of the tire. However, the machine is stopped periodically to detect the beginning of destruction and to chart the alterations in the dimensions of the tire.

The present invention will now be described by reference to the following specific examples. It is to be understood that such examples are presented for purposes of illustration only and the present invention is in no way to be deemed as limited thereto.

EXAMPLE 1

Glass threads of 680 dtex (MN 15), each composed of 408 filaments, were impregnated with an adhesive bath of the following formula (amounts % by weight):

| | |
|---|---|
| water | 69.7% |
| resorcin/formol resin | 3.3 |
| natural rubber latex | 13.5 |
| vinylpyridine latex | 13.5 |

The impregnation was performed in such a way that the dispersion penetrated into the threads and coated the filaments individually. The threads were dried, and thereafter, the impregnation composition was moderately polymerized so that it remained flexible.

Three threads of 680 dtex, coated and impregnated with the adhesive, were then put together and twisted in two successive operations, so as to provide them with a twist of 350 turns per meter. This twist corresponded to a corrected primary twist factor $C_1$ of 126 (disregarding the shrinkage). Three twist yarns thus obtained were thereafter made into cord by giving them an opposite twist of 300 turns per meter in two successive operations. The cord obtained has a corrected secondary twist factor $C_2$ of 184. Its elongation at rupture, determined under the conditions defined above was 2.8 percent.

Then in accordance with FIG. 1, a first series of radial-type tires 1 were built, 165 × 380 in size, comprising a tread 2 supported by a carcass 5 extending from two spaced annular beads 3 containing wires 4. The carcass 5 is made up of a single layer of radial glass cords 6, described above. This layer was composed of 770 cords per meter in width and went from one wire to the other without interruption. The twists of the even cords were in the direction Z S (Z for the twist yarn and S for the cord), while those of the odd cords were in the direction S Z (S for the twist yarn and Z for the cord).

Treads 2 of these tires were reinforced by a breaker 7, made up of four layers of rayon cords of 1,840/2 dtex having twists of Z 460 / S 380 per meter, the density of the layers being 1,150 cords per meter (for the sake of clarity, all the layers of the breaker have not been shown in FIG. 1). P represents the equatorial plane of tire 1.

CONTROL 1

A glass cord was prepared which was identical in all respects to that of Example 1, except that the primary and secondary twists of the cord of 680 × 3 × 3 dtex were respectively, 210 and 160 turns per meter, corresponding to factors $C_1$ and $C_2$ of 74 and 98, respectively. The elongation at rupture of the cord was 2.4 percent.

A second series of tires substantially identical with those of Example 1 was prepared with the above prepared cord except that the tires were reinforced with cords whose primary and secondary twists were not as great.

CONTROL 2

A glass cord was made that was identical in all respects with that of Example 1, except that the primary and secondary twists of the cord of 680 × 3 × 3 dtex were, respectively, 140 and 90 turns per meter, corresponding to twist factors $C_1$ and $C_2$ of 49 and 55, respectively. The cord prepared as above had an elongation at rupture of 2.3 percent.

A third series of tires identical in all respects with those of Example 1 was prepared with the above prepared cords, except they were reinforced with cords whose primary and secondary twists are even more slight than those of the cords of Control 1.

The tires of Example 1 and Controls 1 and 2 and two series A and B of commercial tires, with similar dimensions but reinforced by a radial carcass of rayon cords, were then subjected to test A-2 of resistance to lateral impact of the carcasses, mentioned above. The average results which were obtained are given below in Table I.

TABLE I

| | Reinforcement Cord | | | Tire Number of impacts before destruction according to test A-2 |
|---|---|---|---|---|
| | Primary and secondary twists (turns per meter) | Corrected primary and secondary twist factors $C_1$ and $C_2$ | Elongation at rupture | |
| Example 1 | 350/300 | 126/184 | 2.8 | 370 |
| Control 1 | 210/160 | 74/98 | 2.4 | 126 |
| Control 2 | 140/90 | 49/55 | 2.3 | 83 |
| Series A | — | — | — | 102 |
| Series B | — | — | — | 210 |

The results indicated in Table I show that the resistance to lateral impact of the tires reinforced with a radial layer of glass cords greatly increases when these cords have factors $C_1$ and $C_2$, respectively, greater than 90 and 130, and at the same time have an elongation at rupture less than 3.5 percent

CONTROL 4

Glass treads of 680 dtex (MN 15), each composed of 408 filaments, were impregnated with a bath of adhesive of the identical formula of that of the adhesive bath of Example 1. The impregnation was performed in such a way that this dispersion penetrated into the thread and that it coated the filaments individually. The threads were dried, then the impregnation composition was polymerized moderately so that it remained flexible.

Then three threads of 680 dtex, coated with adhesive and impregnated as described above, were put together and twisted so as to provide them with a twist of 350 turns per meter, corresponding to a primary twist factor $C_1$ of 126 (disregarding shrinkage). Three twist yarns thus obtained were then made into a cord by giving them an opposite twist of 420 turns per meter, corresponding to a secondary twist factor $C_2$ of 256. This cord, because its secondary twist was very high in relation to its primary twist, was unbalanced, and had an elongation at rupture of 4 percent.

Thereafter, in accordance with FIG. 1, a series of radial-type tires 1 was produced with dimensions of 165 × 380 comprising a tread 2, beads 3, wires 4 and carcass 5 made up of a single layer of radial glass cords 6 as described above. The carcass reinforcement layer was composed of 770 cords per meter in width and went from one wire to the other without interruption. The twists of the even numbered cords were in the direction Z S (Z for the yarn and S for the cord), while those of the odd number cords were in the direction S Z (S for yarn and Z for the cord).

Even by alternating twists Z S and S Z, however, the preparation of the layers was very difficult because the sinew-like condition of the cords caused their irregular distribution.

Tread 2 of these tires was reinforced, as in Example 1, by a breaker 7, made up of four layers of rayon cords of 1,840/2 dtex having twists Z 460 / S 380 per meter, the density of the layers being 1,150 cords per meter.

The balancing of these tires was clearly inferior to that of tires made with cords with a slight elongation. In road tests, radial-type tires reinforced with glass cords whose elongation at rupture was greater than 3.5 percent did not provide sufficient safety.

Therefore, this control shows that glass cords having corrected primary and secondary twist factors greater than 90 and 130, respectively, but elongations greater than 3.5 percent are very difficult to work and, in addition, that tires reinforced with these cords cannot be used safely.

EXAMPLE 2

Glass threads of 680 dtex (MN 15) each made up of 408 filaments, were impregnated with an adhesive bath of the formula identical with that of the adhesive bath of Example 1. The impregnation was performed so that the dispersion penetrated inside the thread and gave a good coating to the filaments individually. The threads were dried and then the impregnation composition was polymerized so that it remained flexible. Then, 3 of these threads were individually twisted by giving each of them a twist of 465 Z turns per meter and the three yarns obtained were made into a cord with a twist of 465 S turns per meter. The cord obtained, of 680 × 1 × 3 dtex, twists 465 Z / 465 S, has twist factors $C_1$ and $C_2$, respectively, of 123 and 165, and an elongation of 2.4 percent.

A series of radial-type tires 1, size 165 × 380, were built comprising a tread 2, beads 3, wires 4 and carcass 5 made up of three layers of radial glass cords 6 as described above. Each layer was composed of 770 cords per meter in width and went from one wire to the other without interruption. The twists of the even numbered cords were in the Z S direction (Z for the yarn and S for the cord), while those of the odd numbered cords were in the S Z direction (S for the yarn and Z for the cord).

In addition, another series of tires were built, size 165 × 380, exactly like those of Example 1, i.e., tires reinforced with a single layer of cords of 680 × 3 × 3 dtex. The tires reinforced, on the one hand, with three layers of cords 680 × 1 × 3 dtex and, on the other hand, with only one layer of cords 680 × 3 × 3 dtex contained the same amount of reinforcing glass.

The tires of these two series were subjected to test A-1 but with a wheel without the plunger pin. Under these conditions, the following average kilometers were registered until blow out:

| | |
|---|---|
| tires with a single-layer carcass | 13,300 kms |
| tires with a three-layer carcass | 7,070 kms |

Examination of the cords after blow out showed that the three-layer carcasses had broken in the bending zone (in the sides of the tire) and that the cords themselves were damaged under the breaker. The single-layer carcasses were intact on the sides, but had also suffered deterioration under the breaker.

EXAMPLE 3

Cords were prepared according to the technique described in Example 1, except that 16 glass threads of 680 dtex/408 filaments were twisted 150 turns per meter to form a twist yarn 680 × 16 dtex, which was assembled with two other twist yarns, under opposite twist of 130 turns per meter. The cord obtained, 680 × 16 × 3 dtex, had twist factors $C_1$ and $C_2$, respectively, of 110 and 166. This cord which was correctly balanced had an elongation at rupture of 2.4 percent.

Then, utilizing this cord, layers were prepared containing 500 cords per meter in width, and these were used to make several series of 8.25 × 20 tires for trucks with a single radial layer. The differences between the tires of each of these series were the following:

Series a. — For this series of tires, carcass reinforcement 6 was continuous, as shown in FIG. 1, i.e., the cords went from one wire to another in the radial direction, without interruption under breaker 7. The breaker was made up of 6 layers of rayon cord of 1,840 × 3 dtex, twists Z 390 / S 390 turns per meter, the density of which was 1,000 cords per meter.

Figure 3:
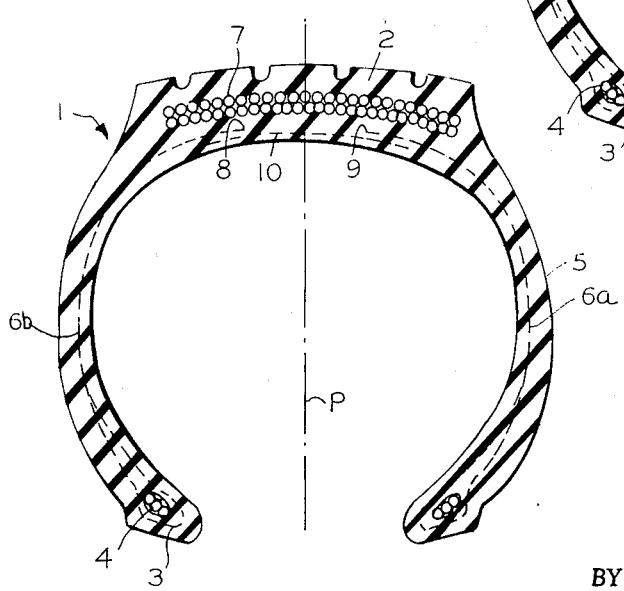
FIG. 3 is a sectional view of a tire in accordance with the present invention with a radial carcass interrupted under the breaker with a substructure reinforcement layer.

Series b. — For this series of tires, the carcass reinforcement was cut under breaker 7 between points 8 and 9 at the level of equatorial plane P, as shown in FIG. 3, so as to leave, upon building of the tire, a gap of 30 mm between the ends of the cords, leading to a gap of 40 mm in the finished tire. In order to hold the ends of the cords of the two half carcasses 6a and 6b in place, a substructure reinforcing layer 10 was placed under them between points 8 and 9. The substructure reinforcing layer 10 was 150 mm wide and was made up of rayon cords of 1,840 × 3 dtex (density 1,000 cords per meter), in which the cords were directed parallel to the glass cords. Breaker 7 and all other elements of the tires of this series (b) were similar to those of the tires of series (a) of this example.

Series c. — The tires of this series were similar to those of series (b) of this example, but differed by the fact that substructure layer 10 was made up of a layer of nylon cords of 940/2 dtex, the density of which was 1,200 cords per meter.

Series d. — The tires of this series were similar to those of series (b) of this example, but they differed by the fact that breaker 7 was made up of two layers of steel cords with 7 × 3 filaments, each having a diameter of 0.15 mm (the density is 630 cords per meter). In addition, these tires had, above the carcass reinforcement and on the edges of breaker 7, two shoulders 45 mm wide (not shown in FIG. 3). Additionally, a central layer of the same nature, 75 mm wide (not shown in FIG. 3) was placed above two layers of the breaker, but with a density of 420 cords per meter.

Series e. — The tires of this series were similar to those of series (b) but the distance between the ends of the layers after vulcanization of the tire was 6 mm (joining half layers at building).

Figure 2:
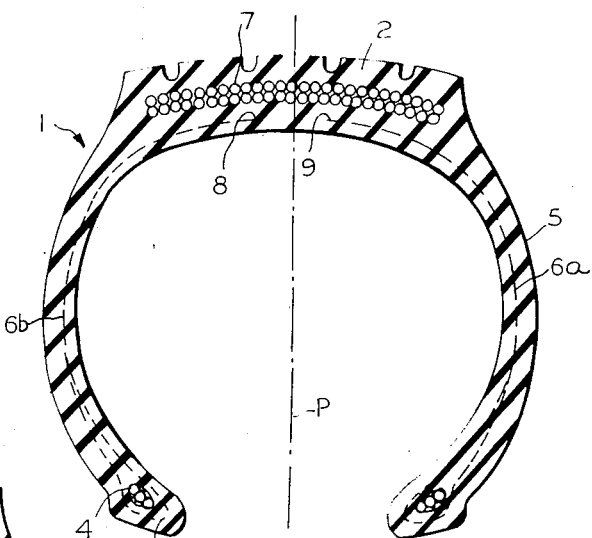
FIG. 2 is a sectional view of a tire in accordance with the present invention with a radial carcass interrupted under the breaker.

Series f. — The tires of this series are similar to those of series (b) of this example, but they differ by the fact that for reasons of simplification and economy, rayon substructure layer 10 was eliminated as in FIG. 2 and replaced by rubber which filled the gap between ends 8 and 9 of the two half layers of carcasses 6a and 6b.

All the tires of series (a) to (f) were tested on rolling machines, by test B described above. The average number of kilometers obtained with the tires of these various series is indicated in Table II.

TABLE II

| Ex. 3 series | glass cords | structure layer | finished tire | breaker | total | overload |
|---|---|---|---|---|---|---|
| | Features of radial carcass with only 1 layer of Sub- | Gap of 2 half carcasses under breaker | | Average kilometers according to test B until blow out with 75% | | |
| a. | continuous carcass under breaker | nothing | — | rayon | 3000 | 0 |
| b. | 2 half carcasses | rayon | 40 mm | rayon | 18500 | 11300 |
| c. | 2 half carcasses | nylon | 40 mm | rayon | 22500 | 15300 |
| d. | 2 half carcasses | rayon | 40 mm | steel | >28000 | >21200 |
| e. | 2 half carcasses | rayon | 6 mm | rayon | 12000 | 4800 |
| f. | 2 half carcasses | nothing | 40 mm | rayon | expanded tire | |

An examination of Table II makes it possible to draw the following conclusions:

For the heavy weight tires of series (a), which contained a continuous layer under the breaker, the cords broke in the zone of equatorial plane P. These tires did not even reach the 75 percent overload zone on the rolling machine and, in addition, at the time of the test, the cords showed ruptures after 1,000 kilometers. Tires reinforced with these continuous layers have only a relatively short life on the road.

On the other hand, cutting of the carcass into two half carcasses, separated at the level of the equatorial plane, gave better results. This is shown for the tires of series (b) which reached 18,500 kms on the rolling machine, according to test B, of which 11,300 kms were with a 75 percent overload.

Comparison of the tires of series (b) and (e) showed, in addition, superior results for the tires of series (b), because the distance between the two half carcasses was greater. Generally, when using half carcasses, each half carcass should penetrate sufficiently between the breaker and the substructure layer so that there is sufficient anchoring of the half carcasses.

Comparison of tires of series (b) and (c) showed, as could have been expected, an advantage for tires comprising nylon substructure layers.

All other conditions being equal, replacement of a rayon breaker with a steel breaker (series (b) and (d)) improved the results markedly.

Finally, it was found that there was no advantage in eliminating the substructure layer (series (f)), because the half carcasses are then poorly anchored. This caused an abnormal expansion of the tire.

For all these series, except (a) and (f), the dimensional stability and the way the tires held the road were excellent.

EXAMPLE 4

A series of passenger car tires was made, similar to the tires of Example 1, but differing by the fact that the continuous carcass was replaced by two half carcasses of cords of 680 × 3 × 3 dtex, separated from one another during fabrication by a distance of 20 mm. The substructure layer was made up of rayon cords of 1,840/2 dtex, twists Z 460 / S 380, the density being 1,150 cords per meter. The cords making up the substructure layer were parallel to the radial glass cords. The width of the substructure layer was 115 mm. The tires of Example 4, therefore, correspond to the tire represented in FIG. 3.

EXAMPLE 5

A series of tires was built similar to those of Example 4 but they differed in that the substructure layer was made up of nylon cords of 940/2 dtex, twists Z 490 / S 460, the density of which was 1,200 cords per meter. These tires also corresponded to the tire represented in FIG. 3.

EXAMPLE 6

A series of tires was built similar to those of Example 4 but differing in that the breaker of rayon cords was replaced by a two layer belt of steel cords 5 × 1, twist 105 turns/meter, the diameter of each individual filament of these cords being 0.25 mm. The density of the breaker cords was 710 cords per meter. These tires also corresponded to the tire represented in FIG. 3.

EXAMPLE 7

A series of tires was built similar to those of Example 4 but differing in that they did not contain a substructure layer. These tires therefore corresponded to the tire shown in FIG. 2.

A first lot of the tires of Examples 4, 5, 6 and 7 was subjected to test A 1, while a second lot of tires of the same Examples 4, 5, 6 and 7 was subjected to test A 3. The results obtained with these tires and those obtained with a series of control tires corresponding to Example 1 are shown in Table III.

elongation at rupture less than 3.5 percent are greatly superior in physical characteristics to conventional glass cords not meeting the foregoing limitations. In addition, it has been clearly shown in the foregoing exemplification that further improvements are realized when the radial carcass composed of such cords of glass fibers comprises only a single layer of cords and, in addition, when such radial carcass is interrupted under the breaker at a level substantially of the equatorial plane of the tire. In addition, it has been clearly shown by the foregoing that additional improvements are seen when such radial carcass is interrupted so as to form two substantially symmetrical half carcasses and when a substructure reinforcement layer is placed under the breaker and under the ends of the two half carcasses, the reinforcing layer having a width at least equal to the distance that separates such two half carcasses.

It should be quite obvious that while the specific exemplifications set forth above have been directed primarily to the reinforcement of tires and pneumatic tires in particular, the novel glass cords of the present invention can be advantageously utilized to reinforce other rubber or plastic materials previously reinforced by organic fibers or glass cords. In this regard, the improvements associated with the use of the glass cords as the radial carcass in tires are also seen to a similar extent in the reinforcement of other related and unrelated rubber or plastic materials.

TABLE III

| Example | Features of radial carcass with only 1 layer of glass cord | Substructure layer | Gap in building 2 half carcasses under breaker | Breaker | Examination of carcasses of tires subjected to test A-1 | | Examination of carcasses after test A-3 |
|---|---|---|---|---|---|---|---|
| | | | | | After 1 hr. | After 5 hrs. | |
| 1 | Continuous carcass under breaker. | Nothing | | Rayon | Several glass cords broken. | | Glass cords intact on sides but damaged under breaker after 20 laps on track. |
| 4 | 2 half carcasses | Rayon | 20 mm | do | Glass cords intact. | Ex. 4-5 substructure layer broken. | Ex. 4-5-6. |
| 5 | do | Nylon | 20 mm | do | do | Glass cords intact. | Tests stopped after 40 laps. Wear on tread but glass cords intact on sides and under breaker. |
| 6 | do | Rayon | 20 mm | Steel | Destruction of tread but cords remain intact. | | |
| 7 | do | Nothing | 20 mm | Rayon | Glass cords remain intact but disengagement of half carcasses | | Deformed tire. |

Examination of Table III makes it possible to establish the following:

1. Replacement of a continuous carcass by two half carcasses with use of a substructure reinforcement layer completely eliminates damage and destruction of the glass cords under the breaker. This is shown in Examples 4, 5 and 6.

2. Elimination of the substructure reinforcement layer is not advantageous, because the tires which do not have it deform.

The observations made in the case of tires for trucks, therefore, conform very closely with those that were made in the case of passenger car tires.

It should be clear from the foregoing that the examples establish the improvement associated with the novel glass cords of the present invention as well as rubber articles, i.e., tires, reinforced therewith. In this regard, it has been shown by the foregoing examples that cords composed of glass fibers individually coated with an elastomer sheath and characterized by having a corrected primary twist factor greater than 90, a corrected secondary twist factor greater than 130, and an While the present invention has been described primarily with regard to the foregoing specific exemplification, it should be understood that the present invention is in no way to be deemed as limited thereto but, rather, must be construed as broadly as all or any equivalents thereof.

What is claimed is:

1. In a tire construction comprising two spaced annular beads, a carcass connecting said beads and an outer tread supported by said carcass and a breaker under said tread, a reinforcing carcass comprising at least one layer of radial cords, wherein each cord of said layer is composed of a plurality of twisted yarns, said yarns being composed of a plurality of glass filaments, each of said filaments being individually coated with an elastomer sheath, said cord being characterized by the following parameters:

A. a corrected primary twist factor greater than 90;
B. a corrected secondary twist factor greater than 130; and
C. an elongation to rupture of less than 3.5 percent.

2. The tire construction of claim 1, wherein said layer of radial cords is interrupted under said breaker at substantially the level of the eqatorial plane of said tire construction, thereby forming two substantially symmetrical halves of said layer of radial cords, each half having a first end extending from said bead and a second end at a position under said breaker, said second ends of said halves being separated a predetermined distance.

3. The tire construction of claim 2. wherein said tire construction further contains a substructure reinforcing element under said beaker, said reinforcing element extending under said second ends of said symmetrical halves of said layer of radial cords and having a width at least equal to said distance which separates said second ends of said symmetrical halves of said layer of radial cords.

4. The tire construction of claim 1. wherein said reinforcing carcass comprises a single layer of said radial cords.

5. The tire construction of claim 4 wherein said layer of radial cords is interrupted under said breaker at substantially the level of the equatorial plane of said tire construction, thereby forming two substantially symmetrical halves of said layer of radial cords, each half having a first end extending from said bead and a second end at a position under said breaker, said second ends of said halves being separated a predetermined distance.

6. The tire construction of claim 5, wherein said tire construction further contains a substructure reinforcing element under said breaker, said reinforcing element extending under said second ends of said symmetrical halves of said layer of radial cords and having a width at least equal to said distance which separates said second ends of said symmetrical halves of said layer of radial cords.

* * * * *